US012039862B2

(12) United States Patent
Bai et al.

(10) Patent No.: US 12,039,862 B2
(45) Date of Patent: Jul. 16, 2024

(54) SYSTEM AND PROCESS FOR MITIGATING ROAD NETWORK CONGESTION

(71) Applicant: GM Global Technology Operations LLC, Detroit, MI (US)

(72) Inventors: Fan Bai, Ann Arbor, MI (US); Donald K. Grimm, Utica, MI (US); Paul E. Krajewski, Troy, MI (US); Jiang-Ling Du, Rochester, MI (US); Mason David Gemar, Cedar Park, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 17/575,017

(22) Filed: Jan. 13, 2022

(65) Prior Publication Data

US 2023/0222901 A1 Jul. 13, 2023

(51) Int. Cl.

*G08G 1/00* (2006.01)
*G08G 1/01* (2006.01)
*G08G 1/048* (2006.01)

(52) U.S. Cl.

CPC ......... *G08G 1/0145* (2013.01); *G08G 1/0133* (2013.01); *G08G 1/0141* (2013.01); *G08G 1/048* (2013.01)

(58) Field of Classification Search

CPC .. G08G 1/0145; G08G 1/0133; G08G 1/0141; G08G 1/048; G08G 1/0129;

(Continued)

(56) References Cited

U.S. PATENT DOCUMENTS

| | | | |
|---|---|---|---|
| 8,032,081 | B2 | 10/2011 | Bai et al. |
| 8,059,012 | B2 | 11/2011 | Bai et al. |

(Continued)

FOREIGN PATENT DOCUMENTS

| | | | |
|---|---|---|---|
| DE | 102008038829 | B4 | 1/2014 |
| DE | 102012213048 | B4 | 1/2014 |

(Continued)

OTHER PUBLICATIONS

S. Zhang, Z. Kang, Z. Zhang, C. Lin, C. Wang and J. Li, "A Hybrid Model for Forecasting Traffic Flow: Using Layerwise Structure and Markov Transition Matrix," in IEEE Access, vol. 7, pp. 26002-26012, 2019, doi: 10.1109/ACCESS.2019.2901118. (Year: 2019).*

(Continued)

*Primary Examiner* — Anne Marie Antonucci
*Assistant Examiner* — Jordan T Smith
(74) *Attorney, Agent, or Firm* — Vivacqua Crane, PLLC

(57) ABSTRACT

A computer is provided for a system for detecting, characterizing, and mitigating road network congestion. The system includes a plurality of motor vehicles. Each motor vehicle includes a telematics control unit (TCU) for generating one or more location signals for a location of the associated motor vehicle and one or more event signals for an event related to the associated motor vehicle. The computer includes one or more processors for receiving the location signal and/or the event signal from the TCU of the associated motor vehicles. The computer further includes a non-transitory computer readable storage medium (CRM) including instructions, such that the processor is programmed to identify a location of the road network congestion at a current time step. The processor is further programmed to track the road network congestion and predict the road network congestion at a next time step.

17 Claims, 4 Drawing Sheets

(58) Field of Classification Search
CPC ............ G08G 1/065; G08G 1/096716; G08G 1/096725; G08G 1/096758; G08G 1/096775; G08G 1/096827; G08G 1/096844; G08G 1/0112; G08G 1/08; G08G 1/081; G06F 17/11
See application file for complete search history.

(56) References Cited

U.S. PATENT DOCUMENTS

| | | | | |
|---|---|---|---|---|
| 8,232,898 | B2 | 7/2012 | Bai et al. | |
| 8,300,564 | B2 | 10/2012 | Grimm et al. | |
| 8,831,869 | B2 | 9/2014 | Bai et al. | |
| 9,430,476 | B2 | 8/2016 | Bai et al. | |
| 9,430,944 | B2 | 8/2016 | Grimm et al. | |
| 9,475,500 | B2 | 10/2016 | Grimm et al. | |
| 10,349,011 | B2 | 7/2019 | Du et al. | |
| 10,838,423 | B2 | 11/2020 | Bai et al. | |
| 11,127,292 | B2 | 9/2021 | Bai et al. | |
| 2007/0208494 | A1* | 9/2007 | Chapman ............ | G08G 1/0104 701/117 |
| 2010/0250346 | A1 | 9/2010 | Bai et al. | |
| 2011/0221901 | A1 | 9/2011 | Bai et al. | |
| 2014/0022321 | A1 | 1/2014 | Komatsu | |
| 2014/0303806 | A1 | 10/2014 | Bai et al. | |
| 2015/0262198 | A1 | 7/2015 | Bai et al. | |
| 2015/0245181 | A1 | 8/2015 | Bai et al. | |
| 2015/0262477 | A1* | 9/2015 | Fowe .............. | G08G 1/096716 701/118 |
| 2016/0025507 | A1 | 1/2016 | Bal et al. | |
| 2017/0146362 | A1 | 5/2017 | Bai et al. | |
| 2017/0352262 | A1 | 12/2017 | Xu et al. | |
| 2017/0353698 | A1 | 12/2017 | Bai et al. | |
| 2018/0350237 | A1* | 12/2018 | Zhong ................... | G06Q 50/40 |
| 2019/0051168 | A1 | 2/2019 | Du et al. | |
| 2019/0122541 | A1 | 4/2019 | Fowe et al. | |
| 2022/0223038 | A1 | 7/2022 | Chikamori et al. | |
| 2023/0377455 | A1* | 11/2023 | Karapantelakis .... | G08G 1/0116 |

FOREIGN PATENT DOCUMENTS

| | | | |
|---|---|---|---|
| DE | 102011120965 | B4 | 9/2014 |
| DE | 102015118093 | A1 | 5/2016 |
| DE | 102016105784 | A1 | 10/2016 |
| DE | 102016207076 | A1 | 11/2016 |
| DE | 102012213799 | B4 | 11/2017 |
| DE | 102011116972 | B4 | 12/2018 |
| DE | 102019114595 | A1 | 2/2020 |
| DE | 102018100112 | B4 | 10/2021 |

OTHER PUBLICATIONS

Ko, E.; Ahn, J.; Kim, E.Y. 3D Markov Process for Traffic Flow Prediction in Real-Time. Sensors 2016, 16, 147. https://doi.org/10.3390/s16020147 (Year: 2016).*

* cited by examiner

SYSTEM AND PROCESS FOR MITIGATING ROAD NETWORK CONGESTION

INTRODUCTION

The present disclosure relates to road network congestion, and more particularly to a computer using floating vehicle data for identifying, tracking, and predicting road network congestion to mitigate the same.

Automotive manufacturers and transportation agencies are continuously investigating systems that mitigate road congestion associated with urbanization trends. These trends can result in commensurate losses in productivity, wasted energy, and increased vehicle emissions. Transportation agencies currently implement sparsely deployed surveillance systems, such as traffic cameras and inductive loop detectors embedded in road surfaces. However, these surveillance systems can be costly, difficult to maintain, ineffective at tracking highly dynamic road conditions, limited in coverage and/or vulnerable to missing data. Other systems implement smartphones and associated smartphone applications, e.g., WAZE or Google Maps, for detecting roadway geometries and estimating vehicular behaviors, including speeds. However, these smartphones can inaccurately detect the position of the smartphone at a lane-level. In addition, some smartphone applications may not be capable of detecting road events, e.g., vehicle collisions.

Thus, while existing systems for mitigating road congestion may achieve their intended purpose, there is a need for a new and improved system that directly uses vehicle data to help address these issues.

SUMMARY

According to several aspects of the present disclosure, a system is provided for mitigating road network congestion. The system includes a plurality of motor vehicles, with each of the motor vehicles having a telematics control unit (TCU). The TCU generates one or more location signals for a location of the associated motor vehicle and one or more event signals for an event related to the associated motor vehicle. The system further includes a display device and a computer, which communicates with the display device and the TCU of the associated motor vehicles. The computer includes one or more processors receiving the location signal and/or the event signal from the TCU of the associated motor vehicles. The computer further includes a non-transitory computer readable storage medium (CRM) including instructions, such that the processor is programmed to identify a location of the road network congestion at a current time step, based on the location signal and/or the event signal. The processor is further programmed to track the road network congestion, based on the location signal and/or the event signal. The processor is further programmed to predict the road network congestion at a next time step, based on the location signal and/or the event signal. The processor is further programmed to generate a notification signal associated with the road network congestion, such that the display device displays the road network congestion in response to the display device receiving the notification signal from the processor.

In one aspect, the processor is programmed to identify the location of the road network congestion by identifying a road edge congestion condition and a road intersection congestion condition for the associated motor vehicles, based on the location signal and/or the event signal. The processor is further programmed to identify the location of the road network congestion by determining a congested region aggregation, based on the road edge congestion condition and the road intersection congestion condition.

In another aspect, the processor is further programmed to determine the congested road aggregation by aggregating a congested intersection and a congested edge that are connected to one another into a first subgraph. The processor is further programmed to aggregate two congested edges that are connected to one another into a second subgraph. The processor is further programmed to merge the first and second subgraphs, delete one or more non-congested edges, delete one or more non-congested intersections, determine a congestion type, and determine a congestion level.

In another aspect, the processor is programmed to track and predict a propagation of the road network congestion in a temporal and spatial domain, based on a Spatio-Temporal Discrete Markovian Process.

In another aspect, the processor is programmed to use the Partial Differential Equation (PDE) according to:

$$x(t)=Fx(t-1)+H_B x_B(t-1)$$

where x(t) is a spatio-temporal regional congestion state at a time step t; where $x_B$ is a congestion state at a boundary condition; and where F and $H_B$ are a PDE diffusion matrix associated with a neighbor geographic impact.

According to several aspects of the present disclosure, a computer is provided for a system including a plurality of motor vehicles. Each of the motor vehicles includes a telematics control unit (TCU) for generating one or more location signals for a location of the associated motor vehicle and one or more event signals for an event related to the associated motor vehicle. The computer includes one or more processors for receiving the location signal and/or the event signal from the TCU of the associated motor vehicles. The computer further includes a non-transitory computer readable storage medium (CRM) including instructions, such that the processor is programmed to identify a location of the road network congestion at a current time step, based on the location signal and/or the event signal. The processor is further programmed to track the road network congestion, based on the location signal and/or the event signal. The processor is further programmed to predict the road network congestion at a next time step, based on the location signal and/or the event signal. The processor is further programmed to generate a notification signal associated with the road network congestion, such that a display device displays the road network congestion, in response to the display device receiving the notification signal from the processor.

In one aspect, the processor is programmed to identify the location of the road network congestion by identifying a road edge congestion condition and a road intersection congestion condition, based on the location signal and/or the event signal. The processor is further programmed to identify the location of the road network congestion by determining a congested region aggregation, based on the road edge congestion condition and the road intersection congestion condition.

In another aspect, the processor is further programmed to identify the road edge congestion condition by determining a Probability Density Function pdf(v), based on a plurality of speeds of the motor vehicles traveling on the associated road edge.

In another aspect, the processor is further programmed to identify the road edge congestion condition by selecting a predetermined statistical metric h(pdf(v)), based on the Probability Density Function pdf(v) as an indicator of a congestion level for the associated road edge.

In another aspect, the processor is further programmed to identify the road edge congestion condition by determining a reference non-congestion speed value g(v) for the associated road edge.

In another aspect, the processor is further programmed to identify the road edge congestion condition by conducting a statistical regression test R between the predetermined statistical metric h(pdf(v)) and the reference non-congestion speed value g(v) as an estimated congestion value.

In another aspect, the processor is programmed to identify the road intersection congestion condition, based on a control delay, an average approach travel time for the associated road intersection, a travel time for an associated motor vehicle across an approach to the associated road intersection, a free-flow travel time for the approach, a count of all vehicles captured within a time interval along the approach, and a set of all approaches at the road intersection.

In another aspect, the processor is further programmed to determine the congested road aggregation by aggregating a congested intersection and a congested edge that are connected to one another into a first subgraph. The processor is further programmed to aggregate two congested edges that are connected to one another into a second subgraph. The processor is further programmed to merge the first and second subgraphs and delete one or more non-congested edges and one or more non-congested intersections. The processor is further programmed to determine a congestion type and a congestion level.

In another aspect, the processor is programmed to track and predict a propagation of the road network congestion in a temporal and spatial domain, based on a Spatio-Temporal Discrete Markovian Process.

In another aspect, the processor is programmed to use the Partial Differential Equation (PDE) according to:

$$x(t)=Fx(t-1)+H_B x_B(t-1)$$

where x(t) is a spatio-temporal regional congestion state at a time step t; where $x_B$ is a congestion state at a boundary condition; and where F and $H_B$ are a PDE diffusion matrix associated with a neighbor geographic impact.

According to several aspects of the present disclosure, a process is provided for operating a computer of a system to mitigate a road network congestion. The system includes a display device and a plurality of motor vehicles, and each of the motor vehicles includes a telematics control unit (TCU). The computer includes one or more processors and a non-transitory computer readable storage medium (CRM) including instructions. The process includes generating, using the TCU of the associated motor vehicles, one or more location signals for a location of the associated motor vehicles and one or more event signals for an event related to the associated motor vehicles. The process further includes identifying, using the processor, a location of the road network congestion at a current time step, based on the location signal and/or the event signal. The process further includes tracking, using the processor, the road network congestion, based on the location signal and/or the event signal. The process further includes predicting, using the processor, the road network congestion at a next time step, based on the location signal and/or the event signal. The process further includes generating, using the processor, a notification signal associated with the road network congestion. The process further includes displaying, using the display device, the road network congestion in response to the display device receiving the notification signal from the processor.

In one aspect, the process further includes identifying, using the processor, a road edge congestion condition and a road intersection congestion condition for the associated motor vehicles, based on the location signal and/or the event signal. The process further includes identifying, using the processor, the location of the road network congestion by determining a congested region aggregation, based on the road edge congestion condition and the road intersection congestion condition.

In another aspect, the process further includes aggregating, using the processor, a congested intersection and a congested edge that are connected to one another into a first subgraph. The process further includes aggregating, using the processor, two congested edges that are connected to one another into a second subgraph. The process further includes merging, using the processor, the first and second subgraphs. The process further includes deleting, using the processor, one or more non-congested edges and one or more non-congested intersections. The process further includes determining, using the processor, a congestion type and a congestion level.

In another aspect, the process further includes tracking and predicting, using the processor, a propagation of the road network congestion in a temporal and spatial domain, based on a Spatio-Temporal Discrete Markovian Process.

In another aspect, the process further includes using, with the processor, the Partial Differential Equation (PDE) according to:

$$x(t)=Fx(t-1)+H_B x_B(t-1)$$

where x(t) is a spatio-temporal regional congestion state at a time step t; where $x_B$ is a congestion state at a boundary condition; and where F and $H_B$ are a PDE diffusion matrix associated with a neighbor geographic impact.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
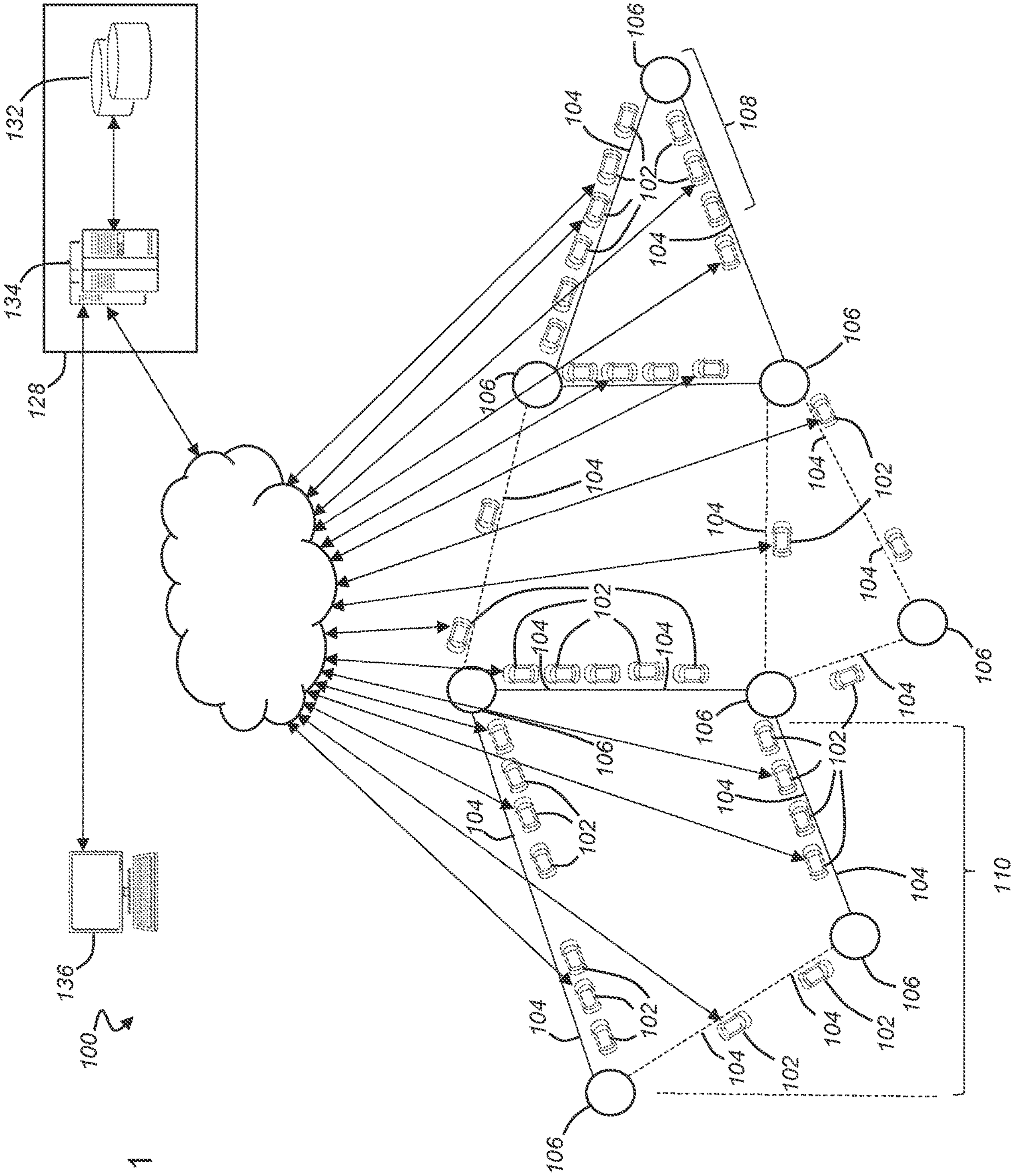
FIG. 1 is a schematic view of a road network having a plurality of road edges and a plurality of road intersections, with one example of a system including a plurality of motor vehicles travelling along the associated road edges and travelling through the associated road intersections.

The following description is merely exemplary in nature and is not intended to limit the present disclosure, application, or uses. Although the drawings represent examples, the drawings are not necessarily to scale and certain features may be exaggerated to better illustrate and explain a particular aspect of an illustrative example. Any one or more of these aspects can be used alone or in combination within one another. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

Referring to FIG. 1, one non-limiting example of system 100 that uses real-time vehicle telemetry data collected at a city-scale to actively identify one or more locations of congestion, track the propagation of the congestion, and predict the evolution of congestion, such that transportation agencies can manage traffic and/or motor vehicles can take alternate routes in view of the congestion.

In this non-limiting example, the system 100 includes a plurality of motor vehicles 102 travelling along associated road edges 104 and travelling through associated road intersections 106. As described in detail below, the system 100 can determine a congested intersection and a congested edge connected to one another form a first subgraph 108 with road congestion, and the system 100 can further determine two congested edges connected to one another form a second subgraph 110 with road congestion.

Figure 2:
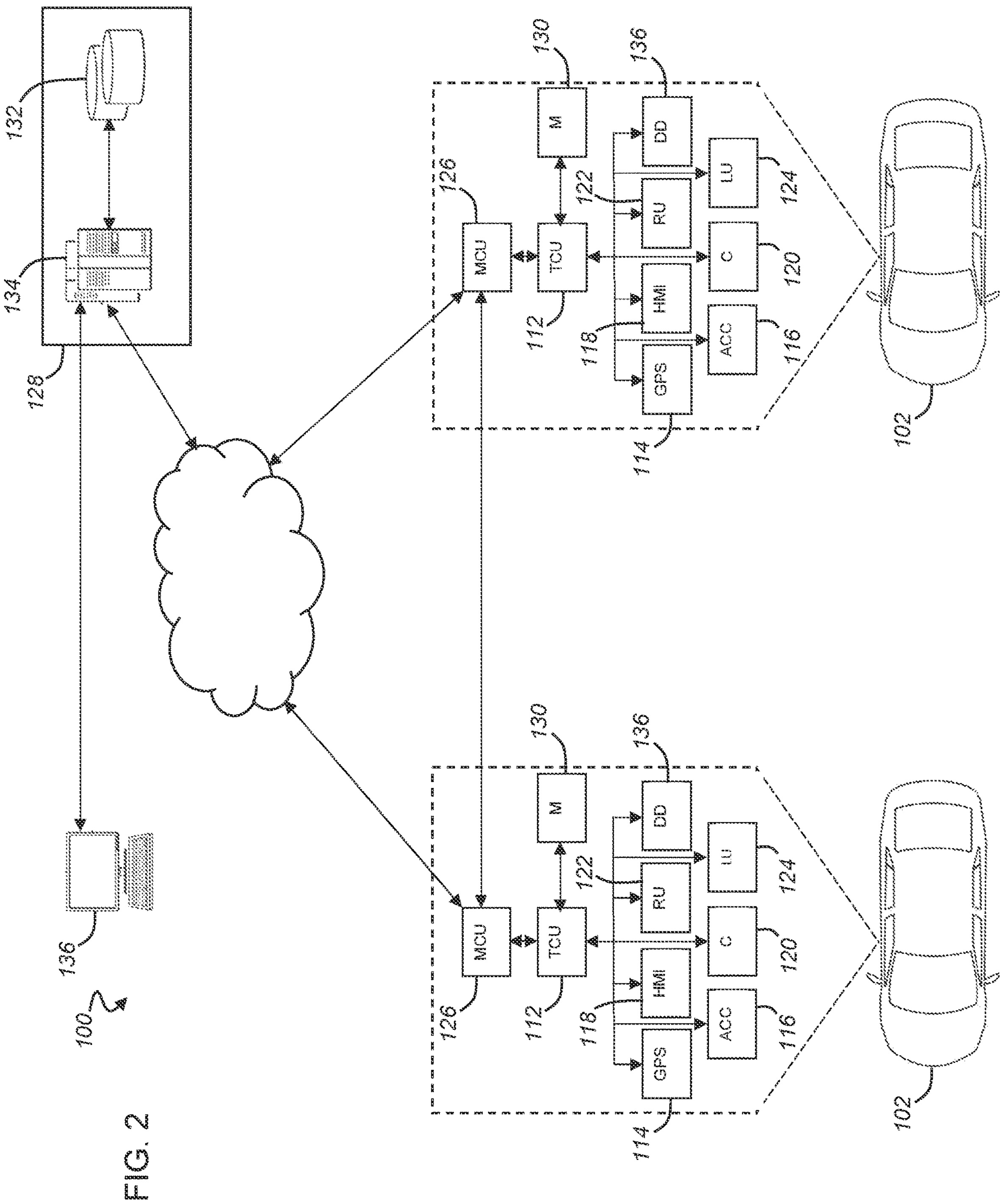
FIG. 2 is a schematic view of the system of FIG. 1, illustrating the system including the motor vehicles with associated Telematics Control Units (TCUs) and a computer communicating with the TCUs for mitigating a road network congestion.

Referring to FIG. 2, each one of the motor vehicles 102 includes a telematics control unit 112 (TCU) for availing telematics services to generate one or more location signals for a location of the associated motor vehicle 102 and one or more event signals for an event related to the associated motor vehicle. In this non-limiting example, the TCU 112 is a micro-controller (a complete computer on a single electronic chip), a microprocessor or field programmable gate array (FPGA). The TCU 112 wirelessly connects the associated motor vehicle 102 to cloud services or other vehicles via V2X or P2P standards over a mobile network. The TCU 112 connects and communicates with various sub-systems over data and control busses (CAN) in the motor vehicle 102 and collects telemetry data. This data includes elements, such as position, speed, engine data, and connectivity quality. It may also provide in-vehicle connectivity through WIFI and BLUETOOTH and enables an e-Call function on relevant markets. The TCU 112 communicates with suitable components of the motor vehicle 102 for collecting telemetry data. Non-limiting examples of these components can include a GPS unit 114, which keeps track of the latitude and longitude values of the motor vehicle 102 such that the TCU 112 can generate the location signals based on the latitude and longitude values. Another non-limiting example of these components can include an accelerometer 116 for detecting a collision, such that the TCU can generate the event signals based on a crash associated with the collision value. Other non-limiting examples of these components can include a Human Machine Interface 118 (HMI), one or more cameras 120, a RADAR unit 122, a LIDAR unit 124, and one or more mobile communication units 126, and an external interface for mobile communication (GSM, GPRS, Wi-Fi, WiMax, LTE or 5G), which provides the tracked values to a centralized computer 128 or database server as described below. The motor vehicles 102 further include an amount of memory 130 for saving GPS values in case of mobile-free zones or to intelligently store information about the vehicle's sensor data. While in this non-limiting example, the TCU is an integral control unit as part of a vehicle system, it is contemplated that the TCU can be equivalent components in a mobile communication device, such as a smart phone.

As described in detail below, the system 100 can include a local road model with Peer-to-Peer (P2P) or edge computing that utilizes the TCU 112 of motor vehicles communicating with the TCU 112 of other motor vehicles 102. Edge computing is a distributed computing paradigm that brings computation and data storage closer to the sources of data to improve response times and save bandwidth. The system 100 can further include cloud computing with a global road model that utilizes a remote computer 128 or server. The computer 128 includes one or more processors 134 and a non-transitory computer readable storage medium 132 ("CRM") including instructions, such that the processor 130 is programmed to receive the location signals and/or the event signals from the TCUs 112 of one or more motor vehicles 102. The processor 134 is further programmed to identify a location of the road network congestion at a current time step, based on the location signals and/or the event signals. The processor 134 is programmed to identify the location of the road network congestion by identifying a road edge congestion condition and a road intersection congestion condition. The processor 134 is further programmed to identify the location of the road network congestion by determining a congested region aggregation based on the road edge congestion condition and the road intersection congestion condition.

The processor 134 is further programmed to identify the road edge congestion condition by determining a Probability Density Function pdf(v) based on a plurality of speeds of the motor vehicles 102 traveling on the associated road edge 104. The processor 134 is further programmed to identify the road edge congestion condition by selecting a predetermined statistical metric h(pdf(v)) based on the Probability Density Function pdf(v) as an indicator of a congestion level of the associated road edge 104 at time (t, t+1). The processor 134 is further programmed to identify the road edge congestion condition by determining a reference non-congestion speed value g(v) for the associated road edge. The processor 134 is further programmed to identify the road edge congestion condition by conducting a statistical regression test R (e.g., Logistic or Lasso regression) between the predetermined statistical metric h(pdf(v)) and the reference non-congestion speed value g(v) as an estimated congestion value Cong(i, t) according to:

$$\mathrm{Cong}(i,t)=R[h(\mathrm{pdf}(v(i,t))),g(v)] \qquad \text{Eq. 1}$$

For people who are skilled in this domain of technical practice, it should be understood that any variants of Eq. 1 or other approaches could be used to achieve the same objective.

The processor 134 is programmed to identify the road intersection congestion condition based on a control delay $d_k$ and an average approach travel time $\overline{tt}_k$ for the associated road intersection k according to:

$$d_k = \frac{\left[\sum_{\forall j \in J,t} \frac{\sum_{\forall j \in n,t} tt_i - fftt_j}{n}\right]}{j} \qquad \text{Eq. 2}$$

$$\overline{tt}_k = \frac{\left[\sum_{\forall j \in J,t} \frac{\sum_{\forall i \in n,t} tt_i}{n}\right]}{j} \qquad \text{Eq. 3}$$

where $tt_i$ represents a travel time for an associated motor vehicle i across an approach j to the associated road intersection; where $fftt_j$ represents a free-flow travel time for the approach j; where n represents a count of all vehicles captured within a time interval t along the approach j; and where J is a set of all approaches at the road intersection. For people who are skilled in this domain of technical practice, it should be understood that any variants of Eq. 2 and Eq. 3 or other approaches could be used to achieve the same objective.

The processor 134 is further programmed to determine the congested road aggregation by aggregating a congested intersection and a congested edge that are connected to one another into a first subgraph. The processor 134 is further programmed to aggregate two congested edges that are connected to one another into a second subgraph. The processor 134 is further programmed to merge the first and second subgraphs. The processor 134 is further programmed to delete one or more non-congested edges and one or more non-congested intersections. The processor 134 is further programmed to determine a congestion type $c_t$ and a congestion level $c_l$ according to:

$$c_t = f(n_{cs}, s_{cs}) \quad \text{Eq. 4}$$

$$c_l = g\left(\frac{CE}{OE}, \frac{CV}{OV}\right) \quad \text{Eq. 5}$$

where $n_{cs}$ represents a number of congested subgraphs; wherein $s_{cs}$ represents a size of congested subgraphs; wherein CE represents the congested edge; where OE represents the overall edge; where CV represents the congested vertex; and wherein OV represents the overall vertex. For people who are skilled in this domain of technical practice, it should be understood that any variants of Eq. 4 and Eq. 5 or other approaches could be used to achieve the same objective.

The processor 134 is programmed to track the road network congestion at a plurality of time steps, based on the location signals and/or the event signals. The processor 134 is programmed to predict the road network congestion at a next time step. More specifically, the processor 134 is programmed to track and predict a propagation of the road network congestion in a temporal and spatial domain based on a Three-Dimensional Spatio-Temporal Discrete Markovian Process (TS-DMP). The processor 134 uses the TS-DMP to model the congestion propagation in both temporal and spatial domain.

Figure 3:
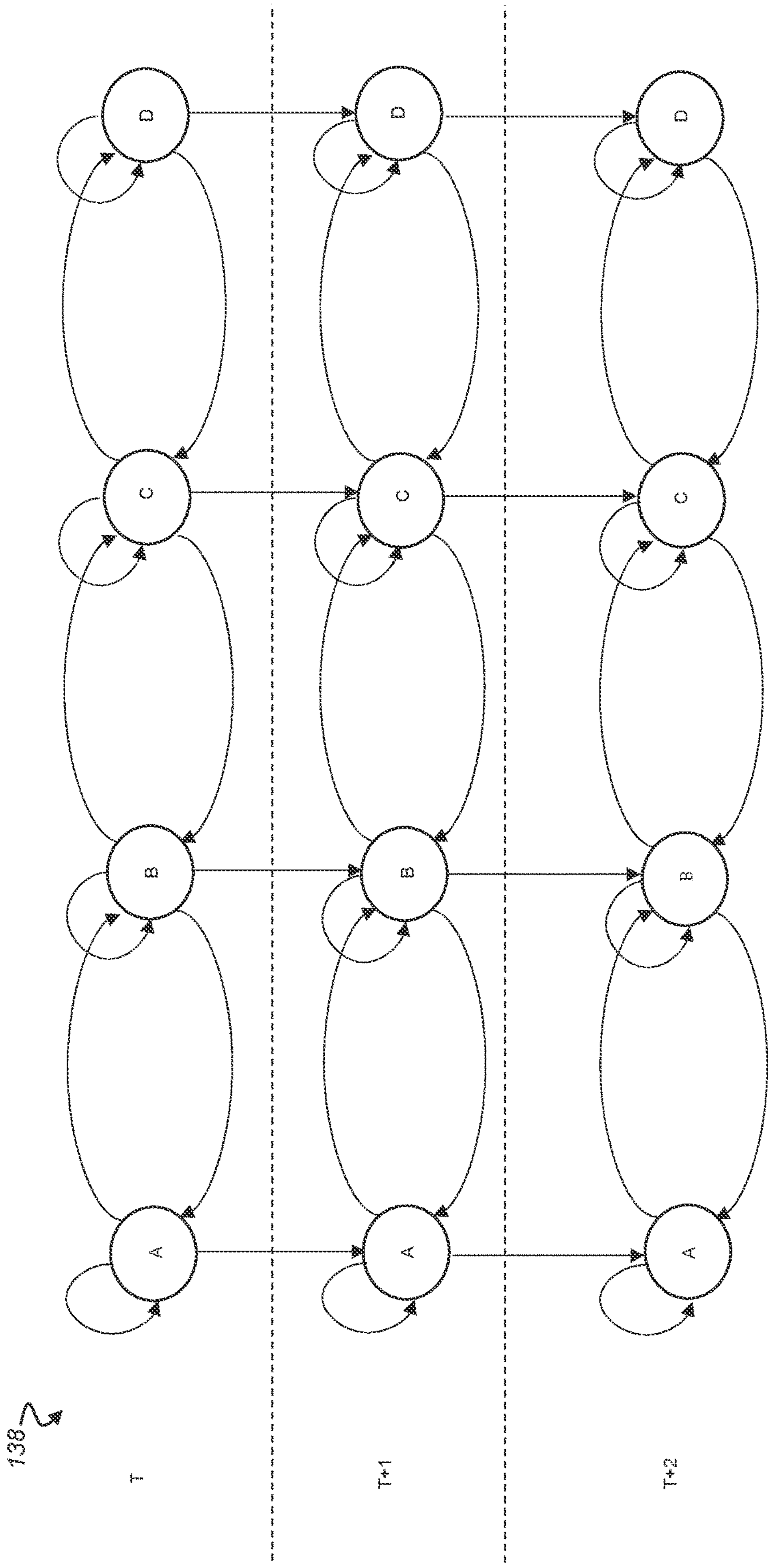
FIG. 3 is a schematic model of the road network of FIG. 1, illustrating a propagation of the road network congestion in both a temporal and spatial domain.

Referring to FIG. 3, in one non-limiting example, the TS-DMP can have three state transitions. In particular, the TS-DMP can have a Self-Transition where region A becomes congested after an event, such as a crash. The TS-DMP can further have a Spatial Propagation where the congestion of region A propagates to upstream region B. The TS-DMP can further have a Temporal Propagation where the congestion of region A at time step t is likely to be the same or similar at time step t+1.

The processor 134 is programmed to use a Partial Differential Equation (PDE) according to:

$$x(t) = Fx(t-1) + H_B x_B(t-1) \quad \text{Eq. 6}$$

where x(t) is a spatio-temporal regional congestion state at a time step t; where $x_B$ is a congestion state at a boundary condition; and where F and $H_B$ are a PDE diffusion matrix associated with a neighbor geographic impact. For people who are skilled in this domain of technical practice, it should be understood that any variants of Eq. 6 or other approaches could be used to achieve the same objective.

In one non-limiting example, for 3-region areas and 2 boundary region areas, the PDE captures the TS-DMP according to:

$$\begin{bmatrix} x_t(A) \\ x_t(B) \\ x_t(C) \end{bmatrix} = \begin{bmatrix} \theta_1 & \theta_2 & \theta_3 \\ \theta_4 & \theta_5 & \theta_6 \\ \theta_7 & \theta_8 & \theta_9 \end{bmatrix} \begin{bmatrix} x_{t\text{-}1}(A) \\ x_{t\text{-}1}(B) \\ x_{t\text{-}1}(C) \end{bmatrix} + \begin{bmatrix} \propto_1 & \propto_2 \\ \propto_3 & \propto_4 \\ \propto_5 & \propto_6 \end{bmatrix} \begin{bmatrix} x_{B,t\text{-}1}(A) \\ \\ x_{B,t\text{-}1}(C) \end{bmatrix} \quad \text{Eq. 7}$$

Where $(\theta_1, \ldots, \theta_9)$ are the elements in the PDE diffusion matrix function F, and $(\propto_1, \ldots, \propto_6)$ are the elements in the PDE diffusion matrix function $H_B$ in boundary region. For people who are skilled in this domain of technical practice, it should be understood that Eq. 7 is mere example how the Partial Differential Equation could be used for congestion prediction in a particular setup.

The processor 134 is programmed to generate a notification signal associated with the road network congestion during at least one of the time steps. The system further includes a display device 136 communicating with the processor 134, such that the display device 136 displays the road network congestion in response to the display device 136 receiving the notification signal from the processor 134. In one non-limiting example, the display device can be a display screen in the motor vehicle for informing the vehicle occupant of the road congestion, such that the occupant can drive the motor vehicle along an alternate route that does not have road congestion. In another non-limiting example, the display device can be a display screen in an autonomous vehicle for informing the vehicle occupant of the road congestion and indicating that the autonomous vehicle will be driven along the alternate route without the road congestion. In still another non-limiting example, the display device can be a monitor of a desktop computer utilized by a transportation agency for analyzing road congestion and modifying traffic control infrastructure to better manage city traffic. In still another example, the display device can be a screen on a mobile communication device, such as a smart phone.

Figure 4:
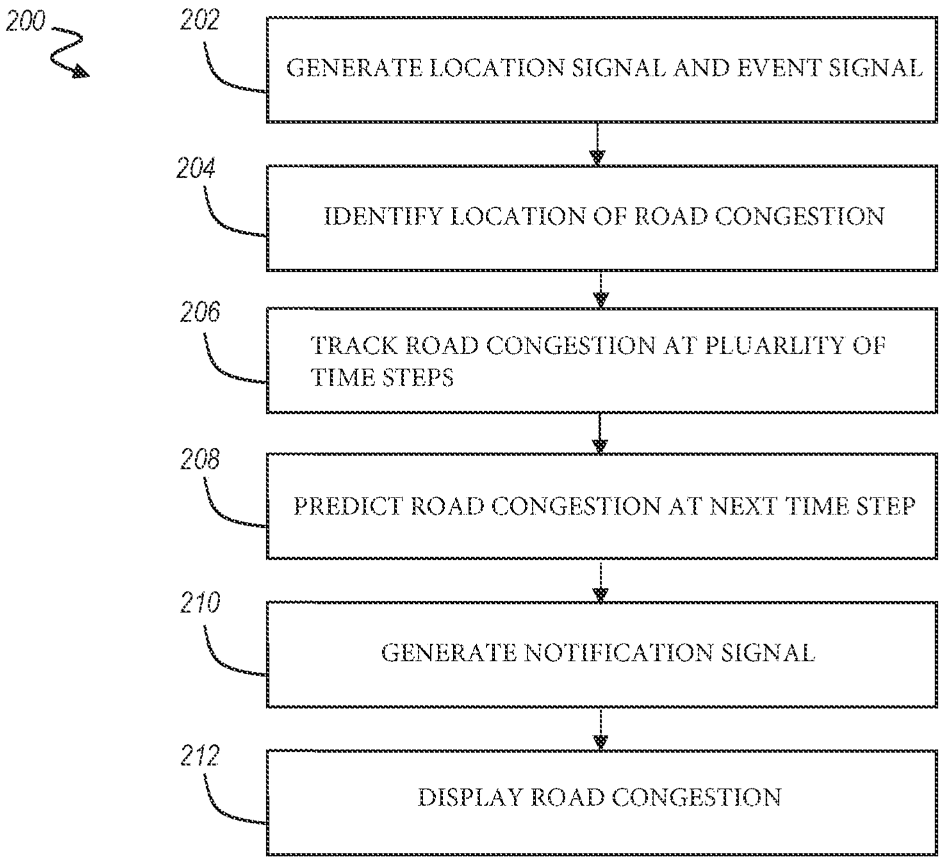
FIG. 4 is a flow chart of one non-limiting example of a process for operating the system of FIG. 1.

Referring now to FIG. 4, one non-limiting example of a process 200 is provided for operating the system 100 of FIG. 1. The process 200 begins at block 202 with the TCU 112 of the associated motor vehicles 102 generating one or more location signals for a location of the associated motor vehicle 102 and one or more event signals for an event related to the associated motor vehicle 102.

At block 204, the process 200 further includes identifying, using the processor 134 (FIG. 2), the location of the road network congestion at the current time step, based on the location signal and/or the event signal. More specifically, the process 200 includes identifying, using the processor 134, a road edge congestion condition and a road intersection congestion condition for the associated motor vehicles 102 according to Equations 1-3 above. The process 200 further includes identifying, using the processor 134, the location of the road network congestion by determining a congested region aggregation based on the road edge congestion condition and the road intersection congestion condition.

More specifically, the process 200 includes aggregating, using the processor 134, a congested intersection 106 and a congested edge 104 that are connected to one another into the first subgraph 108. The process 200 further includes aggregating, using the processor 134, two congested edges 104 that are connected to one another into the second subgraph 110. The process 200 further includes merging, using the processor 134, the first and second subgraphs 108, 110. The process 200 further includes deleting, using the processor 134, one or more non-congested edge 104 and one or more non-congested intersection 106. The process 200 further includes determining, using the processor 134, the congestion type and the congestion level according to Equations 4 and 5 above.

At block 206, the process 200 further includes tracking, using the processor 134, the road network congestion at a plurality of time steps, based on the location signal and/or the event signal. The process 200 further includes tracking and predicting, using the processor 134, the propagation of the road network congestion in the temporal and spatial domain, based on the Spatio-Temporal Discrete Markovian Process. The process 200 includes using, with the processor 134, the Partial Differential Equation (PDE) according to Equations 6 and 7 above.

At block 208, the process 200 further includes predicting, using the processor 134, the road network congestion at a next time step, based on the location signal and/or the event signal.

At block 210, the process 200 further includes generating, using the processor 134, a notification signal associated with the road network congestion for at least one of the time steps.

At block 212, the process 200 further includes displaying, using the display device 136, the road network congestion, in response to the display device 136 receiving the notification signal from the processor 134.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMUEDGE, STATEFLOW, VISUAL BASIC, JAVA SCRIPT, PERL, HTML, TENSORFLOW, PYTHON, PYTORCH, KERAS, etc. Some of these applications may be compiled and executed on a virtual machine, such as the JAVA virtual machine, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The CRM (also referred to as a processor readable medium) participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

In some examples, system elements may be implemented as computer readable instructions (e.g., software) on one or more computing devices, stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system for detecting, characterizing, and mitigating road network congestion, the system comprising:

a plurality of motor vehicles, with each of the motor vehicles having a telematics control unit (TCU) for generating at least one location signal for a location of the associated motor vehicle and at least one event signal for an event related to the associated motor vehicle;

an autonomous host vehicle having a display device and a computer communicating with the display device and the TCU of the associated motor vehicles, the computer comprising:

at least one processor receiving at least one of the location signal and the event signal from the TCU of the associated motor vehicles; and a non-transitory computer readable storage medium including instructions such that the at least one processor is programmed to:

identify a location of the road network congestion at a current time step based on the at least one location signal and the at least one event signal;

track the road network congestion based on the at least one location signal and the at least one event signal using a Partial Differential Equation (PDE), wherein the PDE is defined as:

$$x(t)=Fx(t-1)+H_B x_B(t-1)$$

where x(t) is a spatio-temporal regional congestion state at a time step t;

where $x_B$ is a congestion state at a boundary condition;

where F and $H_B$ are a PDE diffusion matrix associated with a neighbor geographic impact;

predict the road network congestion at a next time step based on the at least one location signal and the at least one event signal using the PDE;

generate a notification signal associated with the road network congestion for at least one of the time steps, such that the display device displays the road network congestion in response to the display device receiving the notification signal from the at least one processor; and operate the autonomous host vehicle based at least in part on the predicted road network congestion at the next time step.

2. The system of claim 1 wherein the at least one processor is programmed to identify the location of the road network congestion by identifying a road edge congestion condition and a road intersection congestion condition for the associated motor vehicles based on the at least one location signal and the at least one event signal, and the at least one processor is further programmed to identify the location of the road network congestion by determining a congested region aggregation based on the road edge congestion condition and the road intersection congestion condition.

3. The system of claim 2 wherein the at least one processor is further programmed to determine the congested road aggregation by:

aggregating a congested intersection and a congested edge that are connected to one another into a first subgraph;

aggregating two congested edges that are connected to one another into a second subgraph;

merging the first and second subgraphs;

deleting at least one non-congested edge and at least one non-congested intersection;

determining a congestion type; and determining a congestion level.

4. The system of claim 3 wherein the at least one processor is programmed to track and predict a propagation of the road network congestion in a temporal and spatial domain based on a Spatio-Temporal Discrete Markovian Process.

5. A computer of a system for detecting, characterizing, and mitigating road network congestion, the system including a plurality of motor vehicles including a host autonomous vehicle, with each of the motor vehicles having a telematics control unit (TCU) for generating at least one location signal for a location of the associated motor vehicle and at least one event signal for an event related to the associated motor vehicle, the computer comprising:

at least one processor receiving at least one of the location signal and the event signal from the TCU of the associated motor vehicles; and a non-transitory computer readable storage medium including instructions such that the at least one processor is programmed to:

identify a location of the road network congestion at a current time step based on the at least one location signal and the at least one event signal;

track the road network congestion based on the at least one location signal and the at least one event signal using a Partial Differential Equation (PDE), wherein the PDE is defined as:

$$x(t)=Fx(t-1)+H_B x_B(t-1)$$

where x(t) is a spatio-temporal regional congestion state at a time step t;

where $x_B$ is a congestion state at a boundary condition;

where F and $H_B$ are a PDE diffusion matrix associated with a neighbor geographic impact;

predict the road network congestion at a next time step based on the at least one location signal and the at least one event signal using the PDE;

generate a notification signal associated with the road network congestion for at least one of the time steps, such that a display device displays the road network congestion in response to the display device receiving the notification signal from the at least one processor; and operate the autonomous host vehicle based at least in part on the predicted road network congestion at the next time step.

6. The computer of claim 5 wherein the at least one processor is programmed to identify the location of the road network congestion by identifying a road edge congestion condition and a road intersection congestion condition based on the at least one location signal and the at least one event signal, and the at least one processor is further programmed to identify the location of the road network congestion by determining a congested region aggregation based on the road edge congestion condition and the road intersection congestion condition.

7. The computer of claim 6 wherein the at least one processor is further programmed to identify the road edge congestion condition by determining a Probability Density Function pdf(v) based on a plurality of speeds of the motor vehicles traveling on an associated road edge.

8. The computer of claim 7 wherein the at least one processor is further programmed to identify the road edge congestion condition by selecting a predetermined statistical metric h(pdf(v)) based on the Probability Density Function pdf(v) as an indicator of a congestion level of the associated road edge.

9. The computer of claim 8 wherein the at least one processor is further programmed to identify the road edge congestion condition by determining a reference non-congestion speed value g(v) for the associated road edge.

10. The computer of claim 9 wherein the at least one processor is further programmed to identify the road edge congestion condition by conducting a statistical regression test R between the predetermined statistical metric h(pdf(v)) and the reference non-congestion speed value g(v) as an estimated congestion value.

11. The computer of claim 10 wherein the at least one processor is programmed to identify the road intersection congestion condition based on a control delay, an average approach travel time for the associated road intersection, a travel time for an associated motor vehicle across an approach to the associated road intersection, a free-flow travel time for the approach, a count of all vehicles captured within a time interval along the approach, and a set of all approaches at the road intersection.

12. The computer of claim 11 wherein the at least one processor is further programmed to determine the congested road aggregation by:

aggregating a congested intersection and a congested edge that are connected to one another into a first subgraph;

aggregating two congested edges that are connected to one another into a second subgraph;

merging the first and second subgraphs;

deleting at least one non-congested edge and at least one non-congested intersection;

determining a congestion type; and determining a congestion level.

13. The computer of claim 12 wherein the at least one processor is programmed to track and predict a propagation of the road network congestion in a temporal and spatial domain based on a Spatio-Temporal Discrete Markovian Process.

14. A process of operating a computer of a system for detecting, characterizing, and mitigating road network congestion, with the system including an autonomous host vehicle having the computer and a display device and including a plurality of motor vehicles, and each of the motor vehicles having a telematics control unit (TCU), the computer including at least one processor and a non-transitory computer readable storage medium including instructions, the process comprising:

generating, using the TCU of the associated motor vehicles, at least one location signal for a location of the associated motor vehicle and at least one event signal for an event related to the associated motor vehicle;

identifying, using the at least one processor, a location of the road network congestion at a current time step based on the at least one location signal and the at least one event signal;

tracking, using the at least one processor, the road network congestion at a plurality of time steps based on the at least one location signal and the at least one event signal using a Partial Differential Equation (PDE), wherein the PDE is defined as:

$$x(t)=Fx(t-1)+H_B x_B(t-1)$$

where x(t) is a spatio-temporal regional congestion state at a time step t;

where $x_B$ is a congestion state at a boundary condition;

where F and $H_B$ are a PDE diffusion matrix associated with a neighbor geographic impact;

predicting, using the at least one processor, the road network congestion at a next time step based on the at least one location signal and the at least one event signal using the PDE;

generating, using the at least one processor, a notification signal associated with the road network congestion for at least one of the time steps;

displaying, using the display device, the road network congestion in response to the display device receiving the notification signal from the at least one processor; and operating, using the at least one processor, the autonomous host vehicle based at least in part on the predicted road network congestion at the next time step.

15. The process of claim 14 further comprising:

identifying, using the at least one processor, a road edge congestion condition and a road intersection congestion condition for the associated motor vehicles based on the at least one location signal and the at least one event signal; and identifying, using the at least one processor, the location of the road network congestion by determining a congested region aggregation based on the road edge congestion condition and the road intersection congestion condition.

16. The process of claim 15 further comprising:

aggregating, using the at least one processor, a congested intersection and a congested edge that are connected to one another into a first subgraph;

aggregating, using the at least one processor, two congested edges that are connected to one another into a second subgraph;

merging, using the at least one processor, the first and second subgraphs;

deleting, using the at least one processor, at least one non-congested edge and at least one non-congested intersection;

determining, using the at least one processor, a congestion type; and determining, using the at least one processor, a congestion level.

17. The process of claim 16 further comprising:

tracking and predicting, using the at least one processor, a propagation of the road network congestion in a temporal and spatial domain based on a Spatio-Temporal Discrete Markovian Process.

* * * * *